W. RICE.
WHEAT DRILL.
No. 48,441.
Patented June 27, 1865.
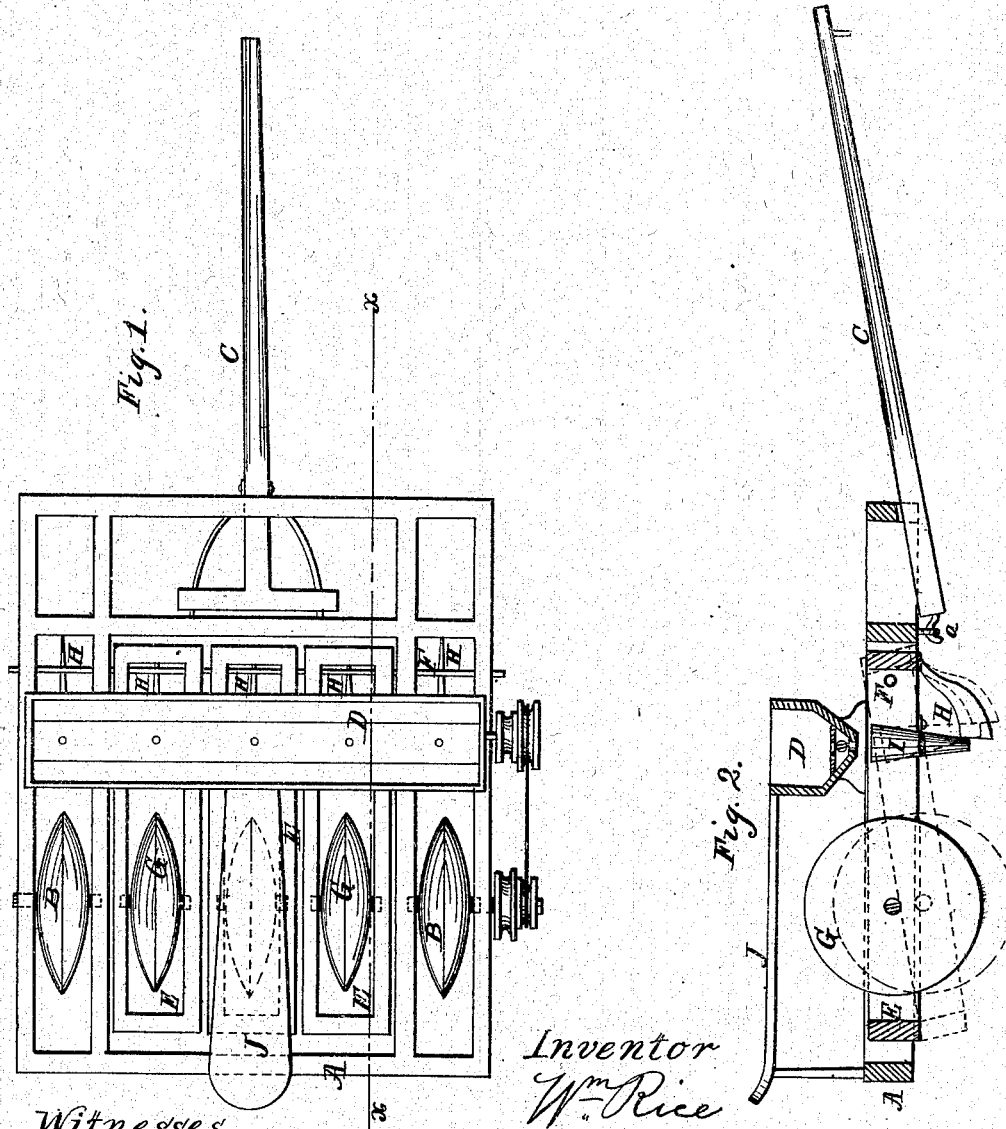

UNITED STATES PATENT OFFICE.

WM. RICE, OF CONCORD, ILLINOIS.

IMPROVEMENT IN WHEAT-DRILLS.

Specification forming part of Letters Patent No. 48,441, dated June 27, 1865.

*To all whom it may concern:*

Be it known that I, WILLIAM RICE, of Concord, in the county of Morgan and State of Illinois, have invented a new and Improved Wheat-Drill; and I do hereby declare that the following is a full, clear, and exact description thereof, which will enable others skilled in the art to make and use the same, reference being had to the accompanying drawings, forming part of this specification, in which—

Figure 1 is a plan or top view of my invention; Fig. 2, a side sectional view of the same, taken in the line $x$ $x$, Fig. 1.

Similar letters of reference indicate like parts.

This invention relates to a new and improved machine for drilling in wheat and other grain, designed more especially for sowing wheat; and it has for its object the depositing of the wheat in the earth in such a manner as to prevent the frost from throwing it out, and also in arranging the several furrow-cutters and their concomitant parts in such a manner that each will have a play or action independent of the other, so that they may conform perfectly to the inequalities of surface over which they may pass; and, further, in attaching the draft-pole to the frame of the machine by a joint to admit of the ready turning of the same, as well as freeing the furrow-cutters from grass, weeds, and other trash which are liable to clog and choke them.

A represents a rectangular frame, which is mounted on two wheels, B B, and has a draft-pole, C, attached to it by hinges or joints $a$ $a$ at its under side and a short distance back of its front end. The wheels B are near the rear of frame A, and this mode of attaching the draft-pole to it admits of the front part of the frame being readily raised, so as to elevate the furrow-cutters above the surface of the ground and admit of the easy turning of the machine at the ends of a field, &c., and also to admit of the furrow-cutters being freed from weeds, grass, and other trash which they may gather or collect during the working of the machine.

On the frame A a seed-hopper, D, is placed, and provided with any suitable seed-discharging device; and E represents a series of oblong quadrilateral frames, the front parts of which are hung loosely and allowed to swing freely on a rod, F, which passes through the frame A transversely. Each of these frames E has wheel G fitted in its rear part, and the peripheries of said wheels are beveled at each side, forming a V-shaped edge, which readily penetrates into the earth. The wheels B B, on which the frame A is mounted, are also constructed in the same manner.

To the front part of each frame E there is attached a furrow-cutter, H. The front parts of these furrow-cutters are curved upward, and they are quite thin, so as to form a deep but narrow cut.

To the rear end of the furrow-cutters H conical tubes I are attached to receive the seed from the hopper D and deposit the same in the narrow furrows made by the cutters H, and at the rear of the same.

The wheels G are in line with the furrow-cutters H, and the wheels B, on which the frame A is mounted, are in line with the two side cutters, H, which are attached directly to frame A. By this arrangement it will be seen that the grain, after having been deposited in the narrow furrows H, will be pressed down into the earth and the furrows opened by the wheels G B. The seed or grain, consequently, will be protected from the frost by these furrows, the frost not being liable, as hitherto, to throw it out of the earth, and in consequence of having the furrow-cutters attached to separate or independent frames the cutters and wheels are allowed to conform to the inequalities of surface over which they may pass, causing the drilling operation to be perfectly performed when the surface of the ground is uneven or undulating.

On the frame A the driver's seat J is placed, the latter being directly back of the seed-hopper D.

I claim as new and desire to secure by Letters Patent—

The combination of the main frame A, pivoted frames E E, wheels B G, and furrow-cutters H, all constructed and arranged to operate as specified.

WILLIAM RICE.

Witnesses:
HARVEY W. JOHNSON,
JOHN E. BAYLESS.